United States Patent [19]

Ewart

[11] Patent Number: 5,077,746

[45] Date of Patent: Dec. 31, 1991

[54] SHORT CAVITY LASERS WITH SINGLE MATE NARROW BANDWIDTH MULTI-PASS AMPLIFIER

[75] Inventor: Paul Ewart, Kidlington, England

[73] Assignee: National Research Development Corporation, London, England

[21] Appl. No.: 543,765

[22] PCT Filed: Feb. 2, 1989

[86] PCT No.: PCT/GB89/00096

§ 371 Date: Jul. 16, 1990

§ 102(e) Date: Jul. 16, 1990

[87] PCT Pub. No.: WO89/07354

PCT Pub. Date: Aug. 10, 1989

[30] Foreign Application Priority Data

Feb. 2, 1988 [GB] United Kingdom ............... 8802294
Jul. 1, 1988 [GB] United Kingdom ............... 8815662

[51] Int. Cl.[5] ........................................ H01S 3/098
[52] U.S. Cl. ........................................ 372/19; 372/54; 372/70; 372/93; 359/333
[58] Field of Search .............. 372/19, 18, 20, 93, 372/53, 54, 70, 99, 102; 330/4.3

[56] References Cited

U.S. PATENT DOCUMENTS

| 3,735,283 | 5/1973 | Waerker et al. ............. 372/19 X |
| 4,314,210 | 2/1982 | Everett ........................ 372/18 |
| 4,344,042 | 8/1982 | Hon ............................. 330/4.3 |
| 4,435,808 | 3/1984 | Javan .......................... 372/11 |
| 4,554,666 | 11/1985 | Altman ........................ 372/19 |
| 4,556,979 | 12/1985 | Scott et al. .................. 372/20 |
| 4,606,031 | 8/1986 | Beene et al. ................. 372/28 |

OTHER PUBLICATIONS

Applied Optics, vol. 25, No. 12, Jun. 15, 1986, Y. J. Xie et al.: "Near Transform-Limited Picosecond Dye Laser Pulses by Cascaded Transient Oscillation", pp. 1877-1878 see p. 1877, column 2, lines 32-35, 44-46; FIGS. 1-4.

IEEE Journal of Quantum Electronics, vol. QE-22, No. 12, Dec. 1986, IEEE, (New York, USO, K. Bohnert et al.: "Tunable Near-Infrared Picosecond Pulses from a Short-Cavity Dye Laser", pp. 2195-2199 see abstract; FIG. 1.

Primary Examiner—William L. Sikes
Assistant Examiner—Galen J. Hansen
Attorney, Agent, or Firm—Cushman, Darby & Cushman

[57] ABSTRACT

A monochromatic dye laser is constructed from a short cavity laser 61 with an external narrow bandwidth amplifier 62 designed to pass only a single mode. The frequency of the SCL is controlled by a servo fed from an interferometer which monitors the spacing of the laser mirrors, while the pass frequency of the NBA is controlled by a servo 68 fed by photodetectors 65,66 which monitor the amplitude of peripheral bands.

13 Claims, 4 Drawing Sheets

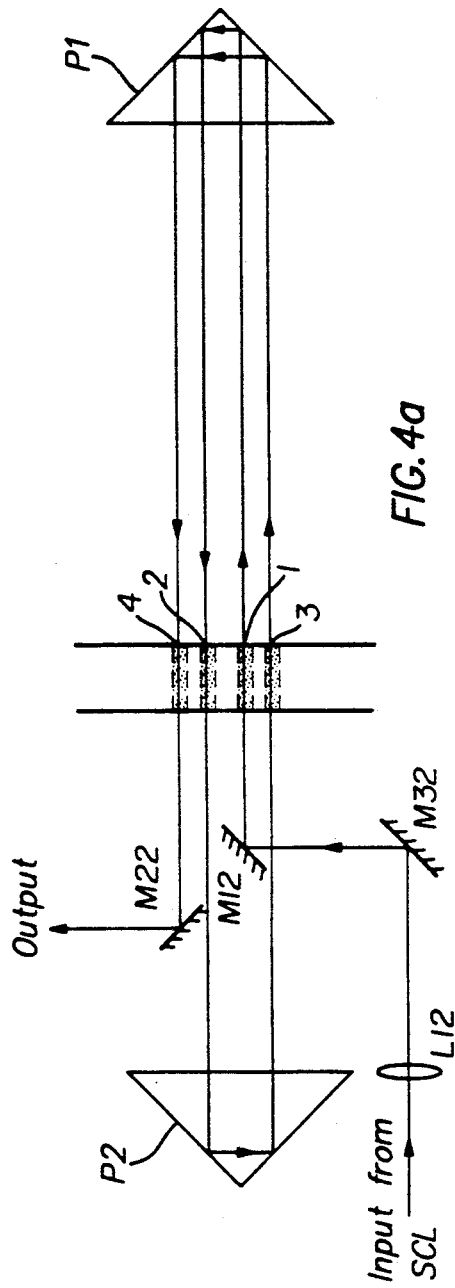
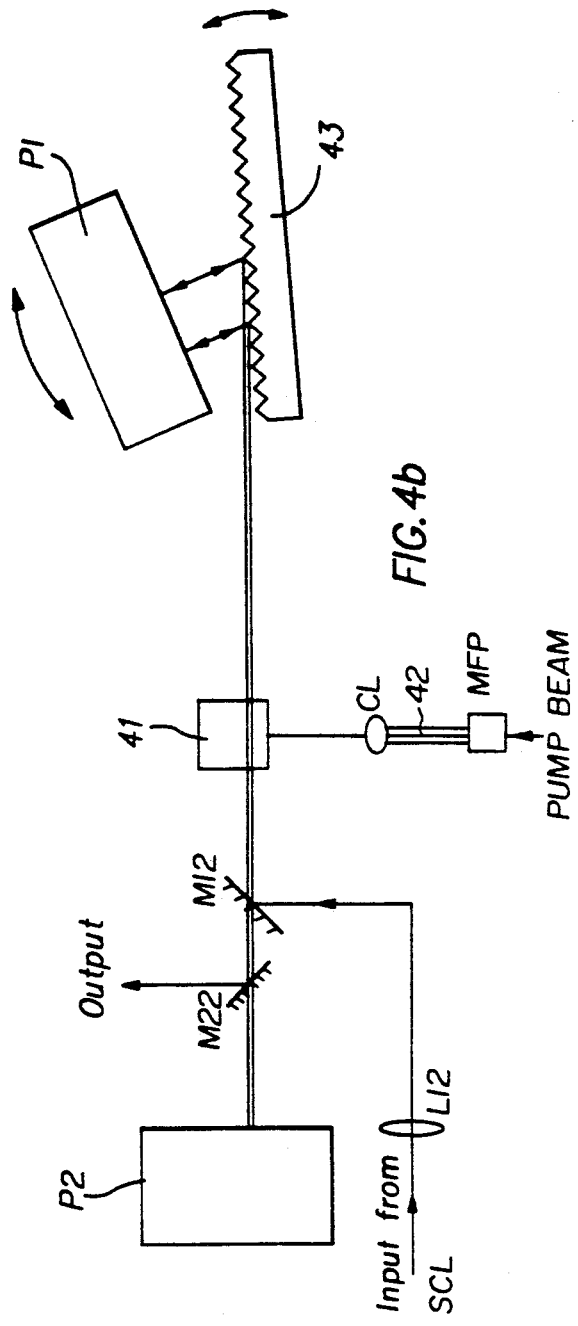

SHORT CAVITY LASERS WITH SINGLE MATE NARROW BANDWIDTH MULTI-PASS AMPLIFIER

This invention relates to lasers and, in particular, to dye lasers. Dye lasers are widely used as sources of frequency tunable, nearly monochromatic light. The spectral width of such lasers can be made more nearly monochromatic by arranging the laser to operate on a single longitudinal mode. The conventional approach to achieving this narrow bandwidth, single mode operation, is to place in the laser resonator some kind of frequency selective element such as a prism, diffraction grating or interference filter. These elements usually introduce large losses and so reduce the Q of the cavity as well as necessitating a long enough cavity length to accommodate them. The chief limitation of these devices lies in the difficulty of tuning the frequency once a single mode has been established. This requires simultaneous adjustment of the frequency selective element and the cavity length, L, since the frequency, $\nu$, must satisfy the mode condition:

$$\nu = mc/2L$$

where m is an integer and c is the speed of light. This places demanding tolerances on the accuracy and stability of mechanical components, their dimensions, positioning and movement must be controlled to within one half a wavelength of light. Failure to remain within these tolerances leads to frequency instability and a very restricted tuning range.

We have adopted a completely different strategy to produce tunable single mode pulsed dye laser radiation. In our device, we use a short, high-Q cavity which emits a comb of longitudinal modes spanning the gain bandwidth of the dye. The single mode selection is done outside the laser cavity.

According to the present invention there is provided apparatus for generating a beam of substantially monochromatic coherent radiation comprising a resonator device for generating a plurality of modes of said radiation together with means external to said resonator device for selectively amplifying a predetermined one of said modes.

The invention will now be particularly described with reference to the accompanying drawings in which:

FIG. 4a is an elevation of a narrow bandwidth amplifier for use with a short cavity length laser and FIG. 4b is a plan view of the same;

In a specific embodiment of the invention, a tunable single-mode pulsed dye laser uses a novel strategy to produce monochromatic radiation. In this device a short high-Q cavity emits a comb of longitudinal modes spanning the gain bandwidth of the dye. Single mode selection is performed outside the cavity by means of a narrow bandwidth amplifier system. The spacing of the modes from the oscillator is $$\Delta\nu_m = c/2L$$

and the bandwidth of the amplifier system $\Delta\nu_{Amp}$ is arranged to satisfy the condition: $\Delta\nu_{Amp} < \Delta\nu_m$. Thus only one mode is effectively amplified and appears in the output. Tuning of the device is achieved by adjusting the length L of the short cavity laser (SCL). Since there are no intra-cavity elements to be adjusted simultaneously, the design and construction of the device is simplified. It is sufficient merely to adjust the centre frequency of the narrow band amplifier (NBA) such that the amplified band of width $\Delta\nu_{Amp}$ includes the mode being selected. Since the spectral width $\delta\nu$ of any mode from the SCL is very narrow, $\delta\nu << \Delta\nu_m$, it is relatively simple to ensure that this mode stays within the gain bandwidth of the NBA.

The tuning range of the device is determined by the change $\Delta L$ in the SCL length and is given by:

$$\Delta\nu_{Range} = [\Delta L/L]$$

Figure 1A:
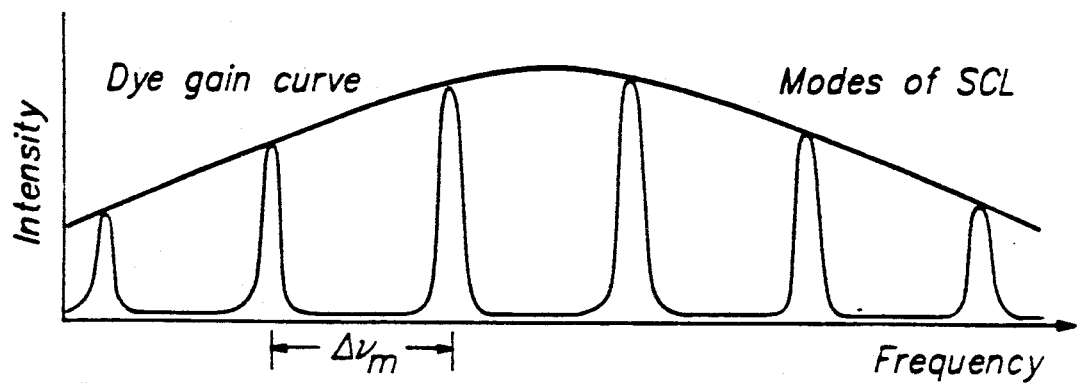
FIG. 1a to 1c is a series of plots of radiation intensity v frequency used for explanation of the operation of embodiments of the invention.

The principle of using a very short cavity to achieve single mode operation is well known in the case where the mode spacing $\Delta\nu_m$ can be made to exceed the bandwidth of the gain medium e.g. in diode lasers or solid state lasers. Such devices emit just a single mode from their resonator cavity. For dye lasers such schemes are impractical due to the very wide bandwidth of the dye gain curve (FIG. 1a).

Figure 1B:
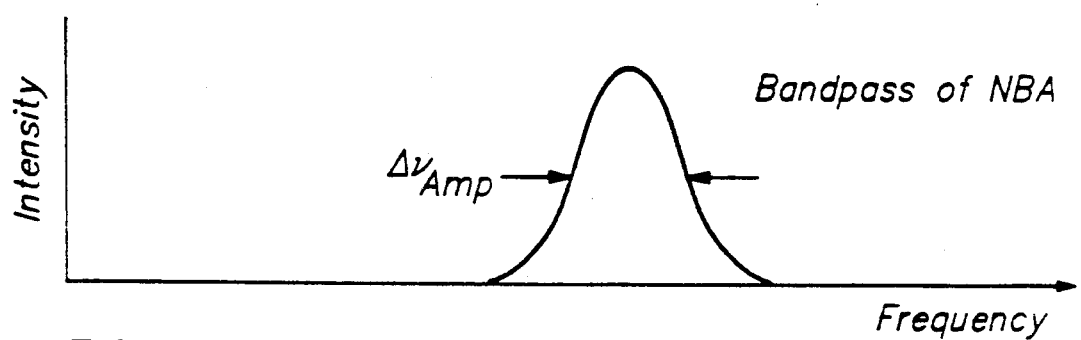
Figure 1C:
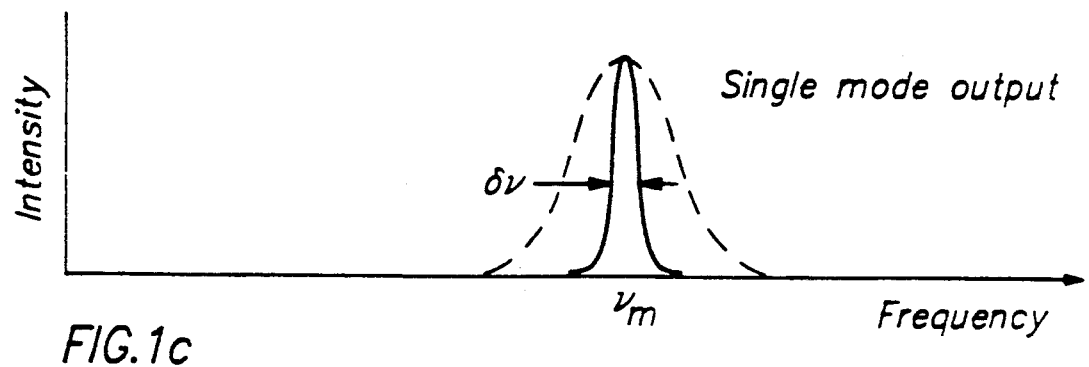

Incorporating the principle of using a SCL and NBA to obtain tunable single mode operation is dependent on the design of both elements of the system (FIGS. 1b and 1c). We now describe the design for an embodiment of this arrangement.

Figure 2:
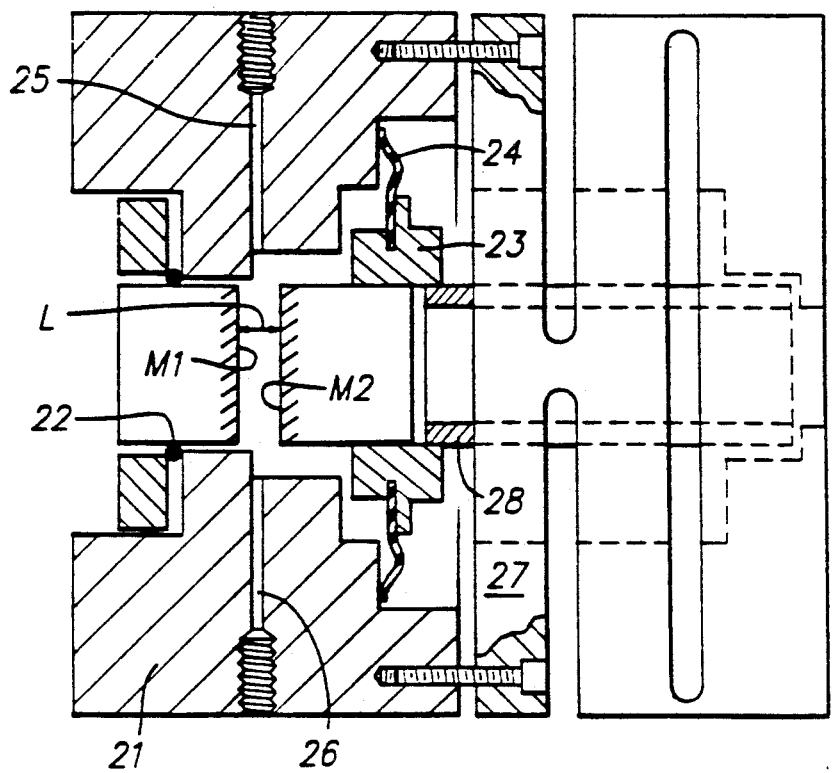
FIG. 2 is a diagrammatic representation of the arrangement of a short cavity length dye laser.

The SCL is shown schematically in FIG. 2. It consists of two plane or curved mirrors M1 and M2 mounted to be parallel and separated by a distance, L, the separation L is typically a few millimeters.

Mirror M1 is mounted in a stainless steel body 21 and fixed rigidly to it by means of an O-ring seal 22. The mirror M2 is sealed to a stainless steel collar 23 which is mounted in a circular flexible diaphragm 24. The outer edge of this diaphragm is clamped to the stainless steel body to seal the cavity formed between M1 and M2. Two channels 25,26 are provided in the body to permit dye solution to flow through the cavity.

A metal (e.g. Dural or steel) flexure mount 27 is secured rigidly to the stainless steel body carrying M1. Mirror M2 is attached to this mount so that it can be adjusted to be parallel to M1. The connection of M2 to the flexure mount is made by a rod or tube 28 whose overall length may be adjusted. This is done for example by incorporating a piezo-electric transducer 29 (PZT). thus the spacing, L, between M1 and M2 may be adjusted by variation of the length of the connecting rod or tube which carries M2. An alternative method of adjustment would be to use variation of pressure in the dye solution between M1 and M2, to extend the diaphragm or gas pressure on the outside face of M2 to compress the diaphragm or other flexible coupling.

Figure 3A:
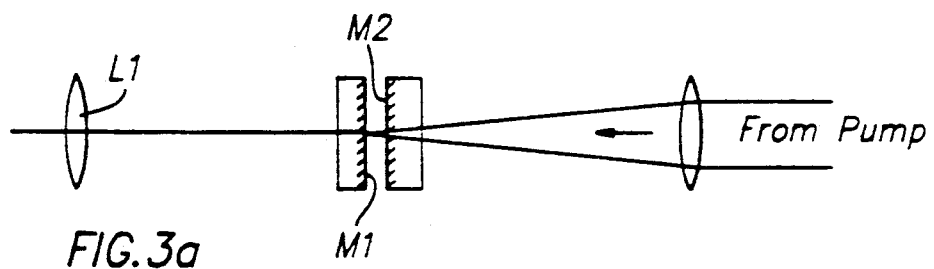
FIG. 3a and 3b illustrate pumping arrangement for the laser of FIG. 2.
Figure 3B:
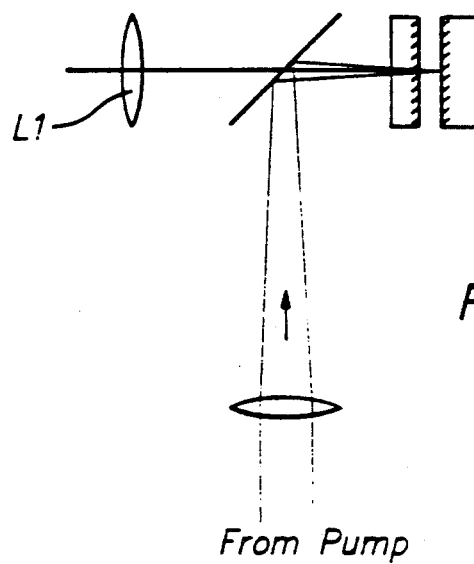

The reflectivities of M1 and M2 are chosen to give a high Q cavity for light at the lasing wavelength of the dye being used. Typically M2 may be close to 100% reflecting and M1 to have a reflectivity between 60% and 90% to act as the output coupler. M2 will then be chosen to have a high transmission at the wavelength of the pumping radiation. The laser is excited by a beam from a pulsed laser (gas, excimer, solid state or liquid) entering via the dichroic mirror M2. Alternatively M1 may be made as a dichroic mirror (high transmission at the wavelength of the pumping laser) to allow the pump light to enter the due. The laser output from M1, now counter-propagating to the pump laser can be separated from the pump by a dichroic beam splitter. These pumping schemes are shown schematically in FIG. 3. The laser output from M1 is collected by a lens L1 which couples it to the narrow band amplifier.

The NBA is shown schematically in elevation FIG. 4a and in plan view FIG. 4b. It consists of a transversely pumped dye cell 41 excited by a number of laser beams 42 to provide a series of parallel regions 1,2,3,4 of amplifying medium. Typically the excitation will be done by the remainder of the pulse used to excite the SCL. The parallel regions are obtained by splitting the pump beam by a multi-faceted prism MFP followed by a cylindrical focusing lens CL. This arrangement of parallel amplifier regions is used to form a compact system to give travelling wave amplification and spectral filtering.

The output of the SCL is directed by lens L12 to beam steering mirrors M32, M12 to pass through amplifier region 1. The amplified output is spectrally filtered before being directed back by reflection at a roof top prism, P1, through the spectral filter to the dye cell to pass through the amplifier region 2. The beam is then reflected by roof-top prism P2 to region 3 and so on until it is directed out by mirror M22. This series of successive amplifications and spectral filtering is carried on until the required bandwidth $\Delta\nu_{Amp}$ is obtained. Two plane mirrors at right angles may be used instead of each roof top prism P1 and P2.

The spectral filter may be a series of prisms, interference filter or filters, or a diffraction grating 43 as shown in FIG. 4b. A diffraction grating is used in the present design since the bandwidth of the device may be adjusted by variation of the number N of grating grooves used. This is readily done by tilting the grating when used close to grazing incidence so that the incident beam is spread over a different width of the grating.

The centre frequency of the bandpass of the NBA is selected by rotating the prism P1. This is set to reflect light diffracted from the grating at the angle, $\phi$, determined by the wavelength $\lambda$ and the incidence angle $\theta$ according to $$\lambda = d(\sin\theta + \sin\phi)$$

where d is the grating groove spacing. The diffraction limited single-pass bandwidth $\Delta\nu$ of the device is given by $$\Delta\nu = \frac{\sqrt{2}\,\nu}{N\pi}$$

The tilt of the grating, and hence N, is adjusted to ensure that the multiple pass bandwidth, $\Delta\nu_{Amp}$ is sufficiently small to isolate a single mode from the SCL. After sufficient transits around the NBA the beam is reflected out of the system by a small mirror or prism. Since no resonant cavity is involved in the NBA, there are no mode matching conditions to be satisfied and no demanding mechanical tolerances.

To tune the frequency of the single mode output, the SCL is tuned by adjusting the voltage applied to the PZT to move M2. Simultaneously the prism P1 in the NBA is rotated to keep the amplifier bandpass centred on the chosen mode frequency. P1 may be rotated by a sine bar drive or rotation stage activated by a PZT. The voltage ramps on the NBA and SCL transducers are adjusted to give synchronous scanning.

Figure 5:
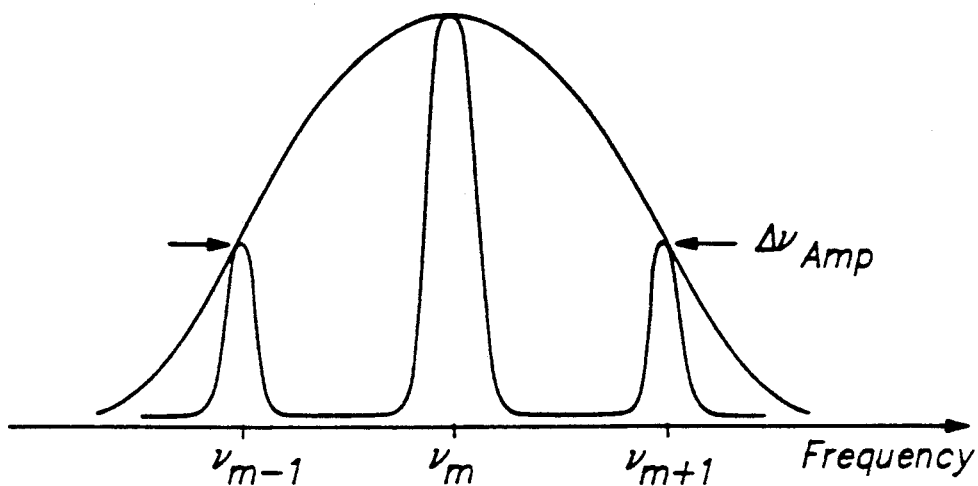
FIG. 5 is and explanatory plot of intensity v frequency.
Figure 6:
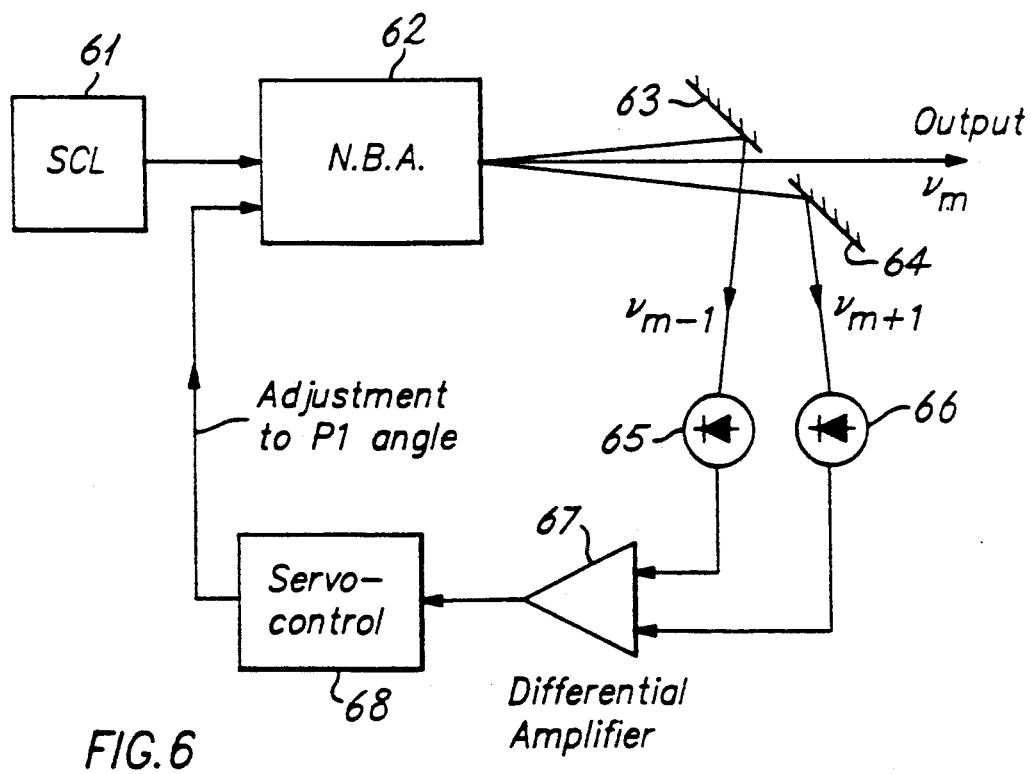
FIG. 6 is a diagrammatic representation of the layout of apparatus in accordance with one aspect of the invention.

To achieve slave-locking of the NBA, the bandwidth $\Delta\nu_{Amp}$ is adjusted to allow the one adjacent mode on either side of the central mode $\nu_m$ to be amplified. This is shown in FIG. 5 These modes $\nu_{m-1}$ and $\nu_{m+1}$ are diffracted at a different angle to the central mode and so appear in the output propagating at a small angle to the central mode. They may thus be separated spatially from the desired mode $\nu_m$ by a simple mirror system as shown in FIG. 6. In this apparatus, the output of a short cavity laser 61 passes through a narrow band amplifier 62. The output thus consists of only the central mode $\nu_m$. The intensity of the side modes will be equal provided $\nu_m$ is centred at the peak of the NBA bandpass. So their intensities may be used to generate an error signal to servo-control the centre frequency of the NBA. The intensity of the modes $\nu_{m-1}$ and $\nu_{m+1}$ reflected by mirrors 63,64 are detected by photodiodes 65,66 and the signals fed to an electronic comparator (differential amplifier) 67. If a difference in intensity is detected, the output of the comparator is amplified and used to drive a servo-control 68 which carries out the adjustment to a prism (not shown) to reset the angle to give equal intensities.

Scanning of the SCL will cause a shift of $\nu_m$ across the bandpass of the NBA leading to change in the relative intensities of $\nu_{m-1}$ and $\nu_{m+1}$. This change is detected by the comparator method just described and the NBA setting will be automatically adjusted to compensate. Thus the NBA will automatically be driven to maintain its bandpass centred on the single mode $\nu_m$ and thus to follow the frequency tuning of the SCL.

The absolute frequency $\nu_m$ of the output of the system may be stabilised using the following scheme. The SCL acts as a Fabry-Perot etalon of spacing L which may be monitored interferometrically. The SCL is illuminated by a monochromatic, continuously working source e.g. a HeNe laser, and the resulting interference fringes detected photoelectrically. A change in L causes a shift in these fringes and a resulting error signal on the detector. A servo-control system may thus be locked to the side or to the peak of one of these fringes. Detection of a fringe shift is used to activate the servo system to adjust, L, by variation of the applied voltage to the PZT in the SCL. Thus any changes in optical thickness L can be compensated by the PZT to maintain constant the mode frequency $\nu_m$. Furthermore the error signal could be used to inhibit the pumping laser from firing so that the SCL only receives a pumping pulse when the length L is within a preset tolerance.

I claim:

1. Apparatus for generating a beam of substantially monochromatic coherent radiation comprising:
    a laser for generating a plurality of modes of said radiation;
    narrow bandwidth amplifier means having a bandwidth less than a spacing between successive ones of said plurality of modes and being positioned external to said laser for selectively amplifying a predetermined one of said modes;

wherein the narrow band amplifier means comprises a transversely pumped dye cell excited by a plurality of laser beams to provide a series of parallel regions of amplifying medium.

2. Apparatus for generating a beam of substantially monochromatic coherent radiation as claimed in claim 1 further comprising beam-splitting means to derive the plurality of laser beams from a pulse used to excite the laser.

3. Apparatus for generating a beam of substantially monochromatic coherent radiation as claimed in claim 2 characterised in that said beam-splitting means comprises a multi-faceted prism.

4. Apparatus for generating a beam of substantially monochromatic coherent radiation as claimed in any one of the preceding claims characterised in that it includes spectral filter means (43) successively to filter radiation which has passed through said amplifying medium.

5. Apparatus for generating a beam of substantially monochromatic coherent radiation as claimed in claim 4 characterised in that said spectral filter means is a diffraction grating (43).

6. Apparatus for generating a beam of substantially monochromatic coherent radiation as claimed in claim 5 characterised in that said spectral filter includes tilt means to tilt the diffraction grating to adjust the pass bandwidth of said amplifier system.

7. Apparatus for generating a beam of substantially monochromatic coherent radiation as claimed in claim 1 characterised in that it includes frequency selection means to select the centre frequency of the bandpass of the narrow band amplifier.

8. Apparatus for generating a beam of substantially monochromatic coherent radiation as claimed in claim 7 characterised in that it includes adjacent-mode sensing (63,64) means to sense the amplitude of modes adjacent to the central pass mode of said amplifier system and feedback means to adjust the setting of said tilt means in response to the relative amplitude of said modes.

9. Apparatus for generating a beam of substantially monochromatic coherent radiation as claimed in claim 1 characterised in that said resonator device (6) comprises a laser having between two mirrors (M1,M2) a cavity adapted to permit a dye solution to flow therethrough.

10. Apparatus for generating a beam of substantially monochromatic coherent radiation as claimed in claim 9 characterised in that it includes tuning means (PZT) for tuning said resonator device (61) by adjusting the spacing between said mirrors.

11. Apparatus for generating a beam of substantially monochromatic coherent radiation as claimed in claim 10 characterised in that said tuning means (PZT) comprises a piezo-electric transducer attached to one of said mirrors (M2).

12. Apparatus for generating a beam of substantially monochromatic coherent radiation as claimed in claim 10 characterised in that said tuning means comprises means (24) responsive to variation of pressure in the dye solution in the cavity between said two mirrors.

13. Apparatus for generating a beam of substantially monochromatic coherent radiation as claimed in any one of the preceding claims 9 to 13 characterised in that the spacing (L) between said two mirrors is of the order of a few millimeters.

* * * * *